United States Patent [19]

Naito

[11] Patent Number: 4,982,232

[45] Date of Patent: Jan. 1, 1991

[54] EXPOSURE CONTROL SYSTEM OF IMAGE FORMING APPARATUS

[75] Inventor: Yoshikazu Naito, Osaka, Japan

[73] Assignee: Minolta Camera Kabushiki Kaisha, Osaka, Japan

[21] Appl. No.: 183,837

[22] Filed: Apr. 20, 1988

[30] Foreign Application Priority Data

| | | | |
|---|---|---|---|
| Apr. 20, 1987 | [JP] | Japan | 62-97153 |
| Apr. 20, 1987 | [JP] | Japan | 62-97154 |
| Apr. 20, 1987 | [JP] | Japan | 62-97155 |
| Apr. 20, 1987 | [JP] | Japan | 62-97156 |

[51] Int. Cl.$^5$ ....................... G03G 21/00; G03B 27/72

[52] U.S. Cl. ....................................... 355/208; 355/69; 355/214; 355/228

[58] Field of Search ............... 355/14 E, 69, 200, 204, 355/208, 214, 228

[56] References Cited

U.S. PATENT DOCUMENTS

| | | | |
|---|---|---|---|
| 4,200,391 | 4/1980 | Sakamoto et al. | 355/14 E |
| 4,215,930 | 8/1980 | Miyakawa et al. | 355/14 E X |
| 4,239,374 | 12/1980 | Tatsumi et al. | 355/14 E |
| 4,354,758 | 10/1982 | Futaki | 355/208 |
| 4,416,535 | 11/1983 | Tottori | 355/246 |
| 4,508,446 | 4/1985 | Imai | 355/208 |
| 4,540,279 | 9/1985 | Irie et al. | 355/69 |
| 4,551,005 | 11/1985 | Koichi | 355/214 |
| 4,627,712 | 12/1986 | Usami | 355/14 E X |
| 4,657,377 | 4/1987 | Takahashi | 355/14 E X |
| 4,702,590 | 10/1987 | Usami | 355/14 E X |
| 4,709,250 | 11/1987 | Takeuchi | 355/214 X |
| 4,711,569 | 12/1987 | Nishimori et al. | 355/69 |
| 4,725,868 | 2/1988 | Okajo | 355/214 |

*Primary Examiner*—Fred L. Braun

*Attorney, Agent, or Firm*—Price, Gess & Ubell

[57] ABSTRACT

An exposure control system includes (a) a first detecting unit for detecting the original image density of an original document and producing a first signal variable with the detected original image density, (b) a control unit for regulating the quantity of light with which the image-carrying document is to be irradiated by the exposure lamp, the quantity of light being regulated on the basis of the signal from the first detecting unit, (c) a reference pattern located to be irradiated with light from the exposure lamp, (d) a second detecting unit for detecting the visualized image density of the reference pattern and producing a second signal variable with the detecting visualized image density, (e) a modifying unit for modifying the quantity of the light from the exposure lamp so that the value represented by the second signal falls within a predetermined range, and (f) a correcting unit for correcting the quantity of light controlled by the control unit, so that the controlled quantity of light is corrected by the correcting unit on the basis of the second signal from the second detecting unit and the quantity of light dictated by the second signal.

18 Claims, 8 Drawing Sheets

EXPOSURE CONTROL SYSTEM OF IMAGE FORMING APPARATUS

FIELD OF THE INVENTION

The present invention relates to an electrophotographic image forming apparatus of the type which transfers visible images to a record medium and, particularly, to an exposure control system of such an image forming apparatus. More particularly, the present invention relates to an exposure control system of an electrophotographic image duplicating or printing apparatus in which images picked up from an original document sheet are to be electrostatically reproduced into visible images on a record medium such as a print sheet. The exposure control system in such an electrophotographic image duplicating or printing apparatus is used to control the quantity of light, or "exposure volume" as herein so referred to, with which the original document sheet is to be irradiated with light during optical scanning operation of the apparatus. The principle of control of such an exposure control system is to regulate the exposure volume in such a manner as to provide established reproducibility for a given original document sheet so that visualized images are to be transferred to a record medium with a proper degree of density.

BACKGROUND OF THE INVENTION

In an electrophotographic image forming apparatus of the visible-image transfer type, a beam of light carrying image information picked up from a given original document sheet is projected onto the photosensitive peripheral surface of a rotating image-transfer drum to produce electrostatic latent images corresponding to the image information. The latent images thus produced on the photosensitive peripheral surface of the image-transfer drum are developed into visible images on a suitable record medium with the agency of toner particles. An image forming apparatus of this type ordinarily has a control system for controlling the density to which images are to be reproduced or printed on a record medium The density of the images to be printed on a record medium can be regulated by controlling the quantity of the toner particles in the developing unit, the bias voltage to be applied to the developing sleeve of the unit, and/or the exposure volume with which the document sheet is to be optically scanned. Examples of such an image density control system are taught in Japanese Provisional Patent Publications (Kokai's) No. 58-23043 (Prior Art "I"), No. 60-133475 (Prior Art "II"), No. 60-146256 (Prior Art i "III"), No. 60-260072 (Prior Art "IV"), and No. 60-119580 (Prior Art "V"). Each of the systems of Prior Art "I" to "IV" depends for its operation on the detection of the density of the visible toner images produced on the photosensitive peripheral surface of the image-transfer drum to control some operational parameters used for the development of latent images into visible ones and the irradiation of an original document sheet. The parameters thus controlled through detection of the toner image density are corrected depending on the ambient temperature and humidity, the time duration for which the developer is to be agitated in the developing unit, and the possible fluctuations in the sensitivity of the drum. On the other hand, the control system of Prior Art "V" depends for its operation on the detection of the distribution of image densities on an original document sheet to determine a degree of contrast for the particular document for regulating the exposure volume so that such a degree of contrast is achieved for the image reproduced.

Problems are however encountered in each of these prior-art control systems. In a density control system of any of Prior Art "I" to Prior Art "IV" in which the density of the images to be reproduced on a record medium is controlled through detection of the visible image produced on the image-transfer drum, there is a problem in that the density of the images to be reproduced is determined without respect to the image density distribution and the degree of contrast of the original document sheet When a document sheet is to be reproduced which has fine linear patterns coarsely distributed within a white background area, the linear patterns are likely to be blurred or even blanked out in the images reproduced. If, conversely, a document sheet having fine linear patterns thickly distributed in a white background area is to be reproduced, the linear patterns tend to be bridged through fogs formed therebetween in the reproduced images. None of the prior-art systems of Prior Art "I" to Prior Art "IV" is furnished with means to cope with such problems These problems are significantly alleviated in a control system of Prior Art "V" in which the degree of contrast for an image to be reproduced is controlled through detection of the distribution of image densities on an original document sheet The control system of this type uses a comparatively low voltage for the document exposure lamp and, for this reason, has a drawback in that there is a tendency to cause fogging on the entire area of the record medium. The fogging is caused especially in the presence of any foreign material or a stain in the optical system or in the event of any environmental change caused in the neighborhood of the photosensitive peripheral surface of the image-transfer drum.

SUMMARY OF THE INVENTION

The present invention contemplates provision of a density or exposure volume control system which will eliminate all these problems that have thus far been inherent in prior-art control systems of the described types. It is, accordingly, an important object of the present invention to provide an improved exposure control system for an electrophotographic image forming apparatus of the visible-image transfer type and capable of reproducing visible images with properly controlled degrees of density for any original document sheet.

It is another important object of the present invention to provide an improved exposure control system which will eliminate any objectionable effect which may result from the variation in the density distribution in the circumferential direction of the photosensitive image-transfer drum which forms part of the electrophotographic image forming apparatus into which the exposure control system is incorporated.

In accordance with the present invention, there is provided in an image forming apparatus including a rotatable member having a photosensitive surface, optical scanning means including an exposure lamp for irradiating an image-carrying original document with light for producing an information-bearing beam of light and projecting the information-bearing beam of light onto the photosensitive surface for producing a latent image thereon, and image reproducing means for developing the latent image into a visible image on the surface, an exposure control system for controlling the quantity of light with which the image-carrying document is to be irradiated, comprising:

a) first detecting means for detecting the original image density of the original document and producing a first signal variable with the detected original image density, (b) control means for regulating the quantity of light with which the image-carrying document is to be irradiated by the exposure lamp, the quantity of light being regulated on the basis of the signal from the first detecting means, (c) a reference pattern located to be irradiated with light from the exposure lamp, (d) second detecting means for detecting the visualized image density of the reference pattern and producing a second signal variable with the detected visualized image density, (e) modifying means for modifying the quantity of light from the exposure lamp so that the value represented by the second signal falls within a predetermined range, and (f) correcting means for correcting the quantity of light controlled by the control means, the controlled quantity of light being corrected by the correcting means on the basis of the second signal from the second detecting means and the quantity of light dictated by the second signal.

BRIEF DESCRIPTION OF THE DRAWINGS

The features and advantages of an exposure control system according to the present invention will be more clearly appreciated from the following description taken in conjunction with the accompanying drawings in which.

DESCRIPTION OF THE PREFERRED EMBODIMENT

Figure 1:
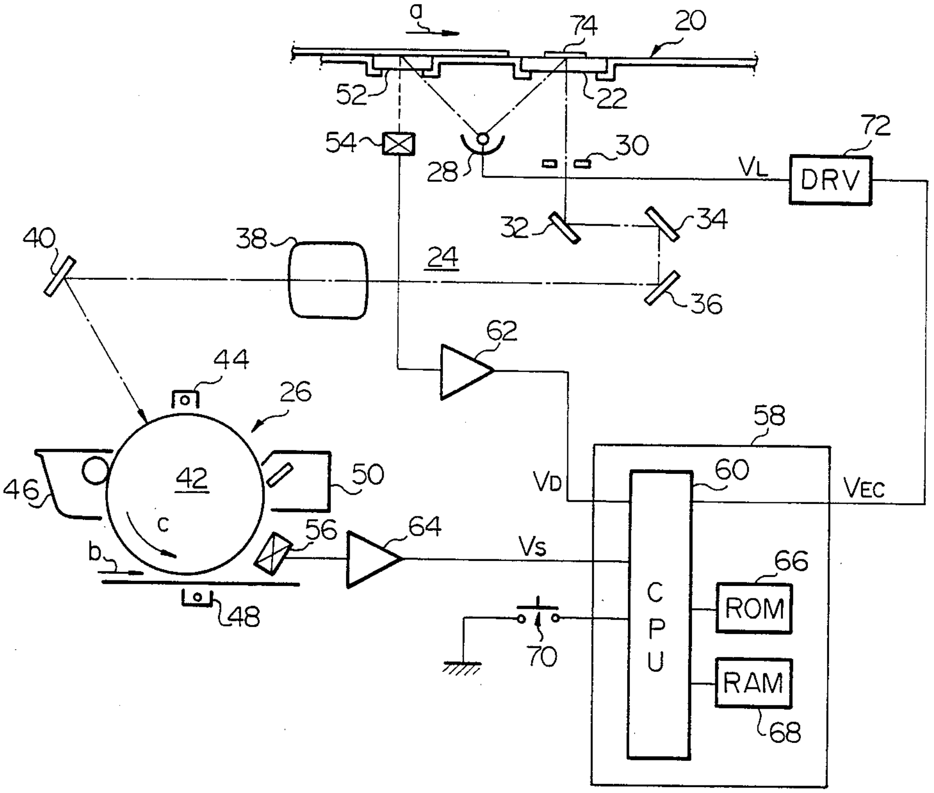
FIG. 1 is a schematic view showing the general optical and mechanical arrangements of an electrophotographic duplicating apparatus incorporating a preferred embodiment of an exposure control system according to the present invention and the general electrical arrangement of the exposure control system thus forming part of the duplicating apparatus.

In the description to follow, an exposure control system according to the present invention is assumed by way of example, as being incorporated in an image forming apparatus exemplified by an electrophotographic image duplicating apparatus (hereinafter referred to simply as copying apparatus) of the visible-image transfer type Such a copying apparatus is shown in FIG. 1 as comprising a housing structure 20 having an upper panel portion formed in part by a transparent main scanning platen 22. A sheet of original document D (hereinafter referred to simply as document sheet) bearing images to be reproduced is to be placed on this main scanning platen 22 and is to be optically scanned while being moved on the main scanning platen 22 in a direction indicated by arrow a. The main scanning platen 22 is elongated in a direction perpendicular to this direction of travel a of the document sheet D.

The document sheet D passing on the main scanning platen 22 is scanned by irradiation with light from an optical scanning system 24. A resultant beam of light carrying information representative of the images on the scanned document sheet D is directed to an image reproduction system 26. The images carried by the light beam are thus provisionally recorded in the form of latent images, which are then developed into visible toner images through an electrophotographic process performed by the image reproduction system 26. The visible toner images are transferred to any record medium such as typically a print sheet (not shown) passed from a print sheet supply unit (not shown) in a direction indicated by arrow b.

The optical scanning system 24 is of the slit exposure type and comprises an exposure lamp 28 from which a beam of light is incident on and reflected from the lower face of the document sheet D on the table 22. The light reflected from the document sheet D is incident onto a first mirror 32 through a slit in an apertured member 30 located below the scanning platen 22 and is re-directed from the mirror 32 rightwardly in the drawing The exposure lamp 28 implements a document scanner in the image duplicating apparatus embodying the present invention The light reflected from the first mirror 32 is re-directed toward a second mirror 34, which further re-directs the light downwardly toward a third mirror 36 located below the second mirror 34.

From the third mirror 36, the light travels forwardly in a direction parallel with but opposite to the direction of travel a of the document sheet D and passes through an image projecting lens unit 38 to a fourth projecting mirror 40. The lens unit 38 is movable with respect to the table 22 in a direction parallel with but opposite to the direction of travel a of the document sheet D. From the projecting mirror 40, light is reflected toward the image reproducing system 26. The exposure lamp 28 and each of the first to fourth mirrors 32, 34, 36 and 40 are herein assumed to be fixedly held in position with respect to the housing 20

The image reproducing system 26 of the apparatus comprises a cylindrical image transfer drum 42 having a photoconductive peripheral surface The light reflected downwardly from the projecting mirror 40 is projected onto the peripheral surface of this image-transfer drum 42. The image-transfer drum 42 is rotatable about its center axis in a direction indicated by arrow c and is driven for rotation at a fixed circumferential speed by suitable drive means (not shown).

The image reproducing system 26 further comprises a main charger 44 to sensitize the photoconductive peripheral surface of the image-transfer drum 42. Posterior to the path of light from the mirror 40 to the image-transfer drum 42 is located an image developing unit 46 detachably mounted in the apparatus and a stock of a developer powder composed of a mixture of electrostatically charged carrier particles and black or otherwise colored toner particles.

Posterior to the developing unit 46 in the direction of rotation of the image-transfer drum 42 is provided a transfer charger 48 which is operative to charge the print sheet so that the toner images formed on the image-transfer drum 42 are transferred to the print sheet. Posterior to this transfer charger 48 in turn is provided a drum cleaner unit 50 which removes any residual toner particles from the peripheral surface of the image-transfer drum 42.

In the upper panel portion of the housing structure 20 is further provided a transparent pre-scanning platen 52 which is located anterior to the main scanning platen 22 in the direction of travel a of the document sheet D and which extends in parallel with the main scanning platen 22 The pre-scanning platen 52 forms part of first or original image density detecting means of a control system according to the present invention. The original image density detecting means further comprises a photoelectric transducer 54 which is located below the pre-scanning platen 52 and which is thus responsive to the beam of light emitted from the exposure lamp 28 and reflected from the document sheet D through the pre-scanning platen 52. The photoelectric transducer 54 is responsive to the original image density (OD) on the document sheet D and produces a signal voltage $V_D$ variable with the detected original image density OD with the document sheet D irradiated with the light emitted from the exposure lamp 28 energized to a predetermined voltage of, typically, 55 volts. The pre-scanning platen 52 and photoelectric transducer 54 implementing the original image density detecting means of the control system embodying the present invention is thus adapted to detect the image density of an original document sheet on a real-time basis, viz., while the document sheet D is being optically scanned by means of the exposure lamp 28.

The photoelectric transducer 54 may be de-activated during scanning of the document sheet D through the main scanning platen 22 or, once the voltage to be applied to the exposure lamp 28 is adjusted, the particular voltage is maintained until the lamp voltage is re-adjusted. In the event any change takes place in the degree of contrast of the document sheet D, the lamp voltage is thus not affected by such a change in contrast since the voltage has been determined on the basis of the original image density of the document sheet D before the document is scanned through the main scanning platen 22. This is useful for eliminating irregularities of duplicating due to a change in the contrast of a document to be duplicated.

Posterior to the developing unit 46 in the direction of rotation c of the image-transfer drum 42 is provided second or visualized image density detecting means of a control system according to the present invention. In the arrangement shown in FIG. 1, such visualized image density detecting means of the control system is located posterior to the transfer charger 48 and anterior to the cleaner unit 50 as shown. The visualized image density detecting means of the control system embodying the present invention comprises a light emitter element (not shown) adapted to emit a beam of light toward the peripheral surface of the image-transfer drum 42 and a photoelectric transducer 56 responsive to the beam of light reflected from the peripheral surface of the drum 42. The light emitter element is implemented typically by a light emitting diode (LED) and each of the photoelectric transducers 54 and 56 may be implemented by a photodiode or a phototransistor. The photoelectric transducer 56 forming part of the visualized image density detecting means of the control system embodying the present invention is operative to detect the density, ID, of the visible toner images produced on the image-transfer drum 42 and produce a signal voltage $V_S$ variable with the detected visualized image density ID.

The photoelectric transducer 54 and 56 thus forming part of the first and second or original and visualized image density detecting means of the control system embodying the present invention are connected to a control circuitry 58 or more specifically to input terminals of a central processing unit 60 incorporated in the control circuitry 58 through amplifiers 62 and 64, respectively. The central processing unit 60 is connected to an external read-only memory (ROM) unit 66 and an external random-access memory (RAM) unit 68 having a backup power supply (not shown). In the ROM unit 66 is stored a set of instructions for the program to be executed by the central processing unit 60. The purpose of the RAM unit 68 will be explained later. Indicated at 70 is an enable switch to enable the central processing unit 60 to operate when an automatic exposure control (AEC) mode is selected by the operator of the apparatus.

Figure 2:
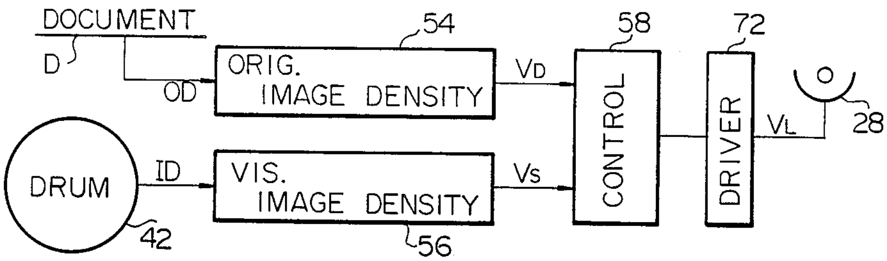
FIG. 2 is a block diagram showing the schematic arrangement of an exposure control system according to the present invention as embodied in the duplicating apparatus illustrated in FIG. 1.

Responsive to the signal voltages $V_D$ and $V_S$ from the photoelectric transducers 54 and 56 and further to the data fetched from the memory units 66 and 68, the central processing unit 60 produces an exposure control signal $V_{EC}$ on the basis of which the exposure volume to be produced by the exposure lamp 28 is to be regulated. The exposure control signal $V_{EC}$ is supplied from the central processing unit 60 to a lamp control circuit 72 including a driver for the exposure lamp 28 so that the voltage $V_L$ with which the exposure lamp 28 is to be energized is controlled on the basis of the control signal $V_{EC}$. FIG. 2 shows the schematic arrangement of the exposure control system according to the present invention comprising the original and visualized image density detecting means represented by the transducers 54 and 56, the control circuitry 58 and the lamp control circuit 72.

As will be readily seen from FIG. 2, the control system according to the present invention is thus operative to regulate the exposure volume for use by the optical scanning system 24 depending on the variable parameters produced on the side of the document sheet D and on the side of the image reproduction system 26 of the apparatus. The control circuitry 58 to form a major part of such a system is typically provided by a semiconductor microcomputer and may be implemented by the microcomputer or one of the microcomputers inherently provided in the copying apparatus for the control of the various steps to be followed by the apparatus.

Figure 3:
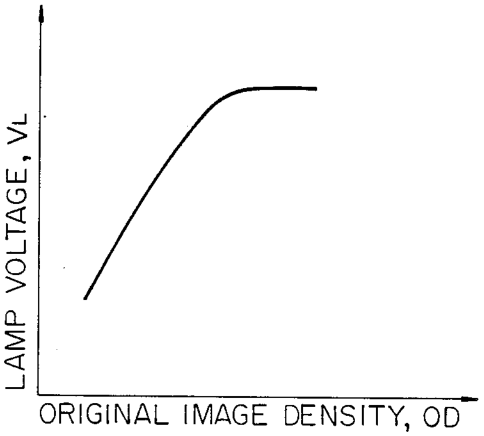
FIG. 3 is a graphic representation of a typical example of the voltage-density characteristics established between a detected original image density and the voltage with which the exposure lamp is to be energized responsive to the detected original image density in a duplicating apparatus using a known exposure control system.

In the meantime, the exposure volume for use by an optical scanning system of a known copying apparatus having an automatic exposure control mode is controlled by regulating the voltage to be supplied to the exposure lamp simply depending on the detected image density of an original document sheet. FIG. 3 shows a typical example of the voltage-density characteristics representative of the relationship between the detected original image density OD which may be represented by the signal voltage $V_D$ and the voltage $V_L$ with which the exposure lamp is to be energized responsive to the detected original image density OD. As will be seen from this FIG. 3, the lamp voltage $V_L$ is regulated to increase as the original image density OD increases. This is intended to avoid an occurrence of fogging in a background area of a printed output and, thus, the principle of control based on the voltage-density characteristics herein shown is used basically in each of the control systems taught in the previously noted Prior Art "I" to Prior Art "IV".

Where the voltage $V_L$ is thus controlled simply on the basis of the detected original image density OD, it may happen that the density of the image reproduced from the document sheet D irradiated by the exposure lamp 28 energized by the voltage $V_L$ differs from the original image density OD. Such a difference results typically from the presence of a foreign material or a stain in the optical scanning system 24 of the apparatus or from any environmental change caused in the neighborhood of the image-transfer drum 42. An environmental change in the neighborhood of the image-transfer drum 42 may be caused by fluctuations in the performance characteristics of any unit of the image reproducing system 26 such as for example the image-transfer drum 42, main charger 44 or developing unit 46. Due to the difference between the original image density OD and the density ID of the visualized image, fine linear patterns coarsely distributed within a white background area of an original document sheet are likely to be blurred or blanked out in the images reproduced or, otherwise, fine linear patterns thickly distributed in a white background area tend to be bridged in the reproduced images, as previously noted.

This is because of the fact that the control system for a known copying apparatus is designed to regulate the exposure volume simply depending on the variable parameters produced on the side of the document sheet D without respect to the variable parameters produced on the side of the image reproduction system of the apparatus. The present invention proposes to control the voltage $V_L$ exposure lamp 28 depending on not only the variable parameters produced on the side of the document sheet D but also the variable parameters produced on the side of the image reproduction system 26 of the apparatus. More specifically, the exposure control system according to the present invention is operative to control the voltage $V_L$ on the basis of not only the signal voltage $V_D$ indicative of the detected original image density OD but the signal voltage $V_S$ indicative of the density ID of the visible image produced in the image reproducing system 26.

Figure 4:
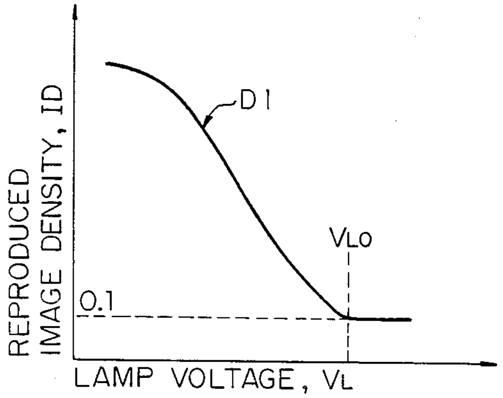
FIG. 4 is a graph representative of a preferred example of the density-voltage characteristics which may be formulated between the voltage with which the exposure lamp is energized for the scanning of a white pattern used in a control system embodying the present invention and the density of the image reproduced from the white pattern.

With a view to offering more ease, accuracy and reliability of detection of the visualized image density ID, the present invention further proposes to perform scanning and development of a reference image for testing purposes. Such a reference image is provided in the form of a white pattern 74 extending along one lateral end of the main scanning platen 22. The white pattern 74 is irradiated with light from the exposure lamp 28 and the resultant latent image of the pattern 74 is developed into a visible toner image on the image-transfer drum 42 before or after the document sheet D to be duplicated is actually scanned over the main scanning platen 22. FIG. 4 shows a curve $D_1$ representative of a preferred example of the density-voltage characteristics in accordance with which the voltage $V_L$ to be applied to the exposure lamp 28 for the scanning of the white pattern 74 in response to the detected density ID of the image reproduced from the white pattern 74. The value 0.1 of the visualized image density ID provides a lower limit value of the range of the density ID which will not cause fogging in a background area of a printed output and the visualized image density ID as detected by the photoelectric transducer 56 is maintained at this value when the lamp voltage $V_L$ is increased beyond a certain threshold level $V_{L0}$.

The relationship between the signal voltage V produced by the photoelectric transducer 56 responsive to a visualized image on the image-transfer drum 42 and the density ID of the image reproduced from the visualized image is established and is stored in the ROM unit 66 preferably in the form of table data so that the visualized image density ID is readily known when the voltage $V_S$ is given.

Figure 5:
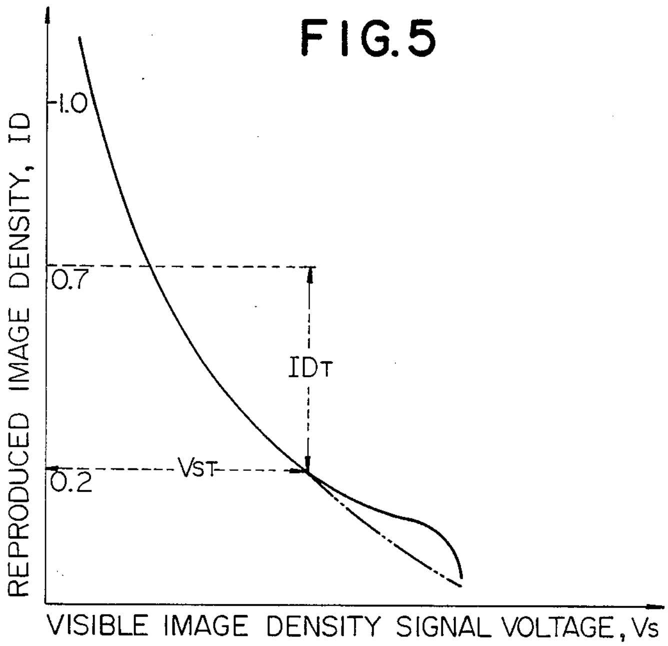
FIG. 5 is a graphic representation of an example of the density-voltage characteristics representative of the relationship thus established between the signal voltage produced from a visualized image density detected from the image reproducing system of the apparatus and the density of the image reproduced from the visualized image.

The signal voltage $V_S$ produced by the photoelectric transducer 56 varying in direct proportion to the quantity of the light reflected from the peripheral surface of the image-transfer drum 42 carrying a visualized image, the voltage $V_S$ can be expressed in the form of an exponential function of the density ID of the image reproduced from the visualized image on the drum 42. FIG. 5 shows an example of the density-voltage characteristics representative of the relationship thus established between the signal voltage $V_S$ and the visualized image density ID. For values less than about 0.2 of the visualized image density ID, however, the signal voltage $V_S$ is affected significantly by the reflective index of the photosensitive peripheral surface of the image-transfer drum 42 per se and departs from the values that would otherwise be dependent on the image density ID as will be seen from FIG. 5. In FIG. 5, the values of the signal voltage $V_S$ dependent on the visualized image density ID less than 0.2 is indicated by dots-and-dash line. By reason of such degraded dependability of the signal voltage $V_S$ on the visualized image density ID less than 0.2, inaccurate values of the density ID would result from the signal voltage $V_S$ if the values of the density ID less than 0.2 are determined directly from the relationship depicted in FIG. 5. On the other hand, for values larger than about 0.7 of the visualized image density ID, the rate of change in the signal voltage $V_S$ is significantly low compared with the rate of change in the visualized image density ID and, again, there result inaccurate values of the density ID from the signal voltage $V_S$ if the density larger than 0.7 is determined directly from the relationship demonstrated in FIG. 5.

For these two principal reasons, the voltage $V_L$ with which the exposure lamp 28 is to be energized for optically scanning the document sheet D is regulated preferably in such a manner that the density ID of the image reproduced from the visible image produced on the photosensitive peripheral surface of the image-transfer drum 42 ranges from about 0.2 to about 0.7. Of the table data stored in the ROM unit 66 for providing the density-voltage characteristics of FIG. 5, only the portion of the data which falls within the range indicated by $V_{ST}$ for the signal voltage $V_S$ and by $ID_T$ for the visualized image density ID in FIG. 5 is thus regarded as being effective and utilized as valid data.

Figure 6:
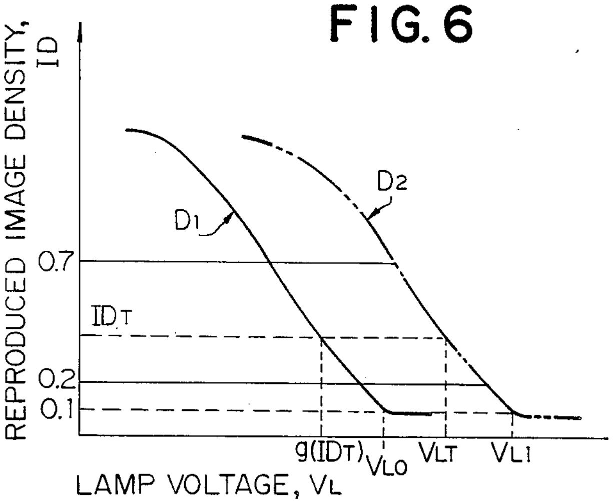
FIG. 6 is a graph similar to FIG. 4 but now shows a shift caused in the density-voltage characteristics between the lamp voltage and the reproduced image density due to any environmental change invited in the neighborhood of the image-transfer drum in the duplicating apparatus.

In the event, on the other hand, of any fluctuations occurring in the performance characteristics of any unit or units of the image reproducing system 26 such as typically the image-transfer drum 42, main charger 44 and developing unit 46, the relationship between the lamp voltage $V_L$ and the visualized image density ID as represented by curve $D_1$ in FIG. 4 may shift to the relationship indicated by curve $D_2$ in FIG. 6. As a result of this shifting of the relationship between the lamp voltage $V_L$ and image density ID, the threshold value of the lamp voltage $V_L$ to provide the visualized image density ID of 0.1 shifts from the value $V_{L0}$ to a value $V_{L1}$ as will be seen from FIG. 6. It is in this instance considered that the characteristics represented by curve $D_1$ is translated as it is into the characteristics indicated by curve $D_2$ for the range of 0.2 to 0.7 of the visualized image density ID. If the lamp voltage $V_L$ given by curve $D_1$ is expressed in the form of a function g(ID) so that $$V_L = g(ID), \quad (1)$$

then the corresponding lamp voltage $V_{L1}$ shifted from the voltage $V_{L0}$ is expressed as $$V_{L1} = V_{LT} + (V_{L0} - g(ID_T)), \quad (2)$$

wherein the relationship between the fixed lamp voltage V and the function g(ID) is known and stored in the ROM unit 66.

It will be understood from the foregoing description that, when the white pattern 74 is scanned and developed, the value of the lamp voltage $V_L$1 can be obtained more accurately from the relationship between the effective visualized image density $ID_T$ and the lamp voltage $V_{LT}$ dependent on the density $ID_T$ than by directly obtaining the voltage $V_L$ T yielding the value 0.01 of the density ID.

In the meantime, the photoelectric transducer 56 located in the vicinity of the image-transfer drum 42 is subject to contamination with toner particles during operation of the apparatus and, for this reason, the signal voltage $V_S$ produced by the transducer 56 tends to decline during use of the apparatus and gives rise to an increasing error in the detected image density represented by the signal voltage.

To eliminate or minimize such an error, it is further proposed by the present invention that the voltage $V_{ST}$ from which the effective visualized image density $ID_T$ is to be obtained be corrected by the signal voltage $V_{S0}$ produced from the photoelectric transducer 56 responsive to the image-transfer drum 42 having no visualized images carried on its photosensitive peripheral surface. The voltage thus corrected is given, when written as $V_{ST}'$, by the equation $$V_{ST}' = k\, x(V_{ST}/V_{S0}), \quad (3)$$

where k is a constant which is defined by the voltage produced by the photoelectric transducer 56 responsive to the image-transfer drum 42 having its photosensitive peripheral surface maintained perfectly clean and uncontaminated with toner particles. Each of the parameters $V_{ST}$ and $V_{S0}$ contains a factor to be affected by the contamination of the drum 42 with toner particles and, thus, such factors are effectively cancelled by each other in the equation (3). Using such a corrected voltage $V_{ST}'$ in determining the effective visualized image density $ID_T$ is beneficial not only for avoiding the influence of the contamination with toner particles but for eliminating errors which may result from the fluctuations in the temperature characteristics of the photoelectric transducer 56 and the associated amplifier 64.

To avoid an occurrence of fogging in a background area 7/ of a printed output, the voltage $V_L$ with which the exposure lamp 28 is to be energized during automatically controlled scanning operation is usually regulated to increase as the original image density OD increases, as previously noted with reference to FIG. 3. In this instance, the lamp voltage $V_L$ is regulated in such a manner as to maintain a certain relationship between the original image density OD and the voltage $V_L$, the voltage-density characteristics of FIG. 3 being a typical example of such a relationship.

Figure 7:
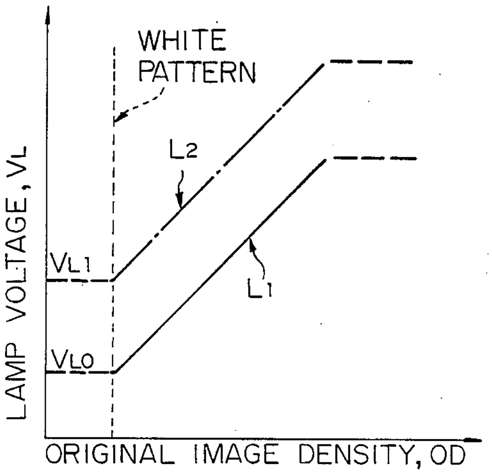
FIG. 7 is a graph essentially similar to FIG. 3 but is a graph essentially similar to FIG. 3 but further shows the voltage-density characteristics shifted from the characteristics indicated in FIG. 3 when the threshold level of the lamp voltage is increased.

In the exposure control system embodying the present invention, the lamp voltage $V_L$ is further controlled to prevent an occurrence of fogging for any original image density OD for the purpose of making it possible to produce a printed output having a proper degree of contrast from an original document sheet having a relatively low degree of contrast. For this purpose, the relationship between the original image density OD and lamp voltage $V_L$ as represented by the characteristic curve shown in FIG. 3 and further by curve $L_1$ in FIG. 7 is shifted to the relationship indicated by curve $L_2$ in FIG. 7 when the threshold level of the lamp voltage $V_L$ providing the visualized image density ID of 0.1 is increased from $V_{L0}$ to $V_{L1}$. As a result of this shifting of the relationship between the image density OD and lamp voltage $V_L$, the voltage $V_L$ with which the exposure lamp 28 is to be energized for scanning the white pattern 74 is shifted from the value $V_{L0}$ to the value $V_{L1}$ as will be seen from FIG. 7.

In the event any change is caused in the image forming characteristics on the part of the image reproducing system 26 including the image-transfer drum 42, main charger 44 and image developing unit 46, the characteristic relationship between the original image density OD and the lamp voltage $V_L$ specifically determined for the image density OD is thus modified and corrected on the basis of the information produced from the white pattern 74 In this instance, the voltage-density characteristics for the original image density OD and lamp voltage $V_L$ as represented by curve $L_1$ is translated into the characteristics indicated by curve $L_2$ also for the range of the density OD higher than the image density of the white pattern 74. This means that the shifting of the voltage-density characteristics from those indicated by curve $L_1$ to those indicated by curve $L_2$ is useful for preventing an occurrence of fogging on a printed output when an original image of any degree of density is to duplicated. It may be noted that, when an original image has a density higher than a certain limit value, it is impossible to prevent an occurrence of fogging on a background area of a printed output. In FIG. 7, the voltage-density characteristics resulting from such high original image densities are indicated by broken lines.

Figure 8:
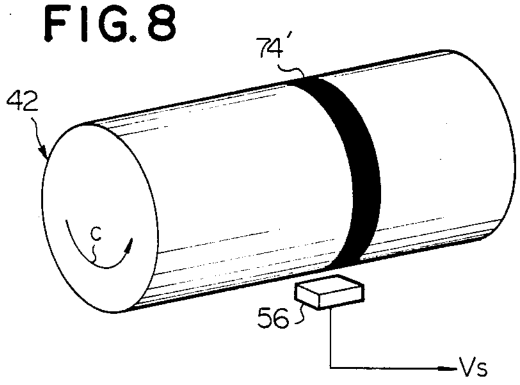
FIG. 8 is a perspective view of the image-transfer drum forming part of the image reproducing system of the apparatus illustrated in FIG. 1 and having a visible toner image of the white pattern used as a reference image in the control system embodying the present invention.
Figure 9:
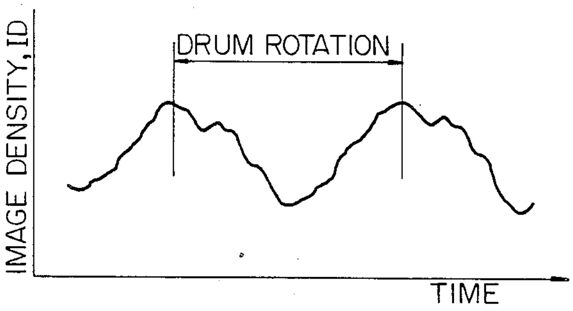
FIG. 9 is a timechart showing a waveform of the signal voltage representative of the visualized image density detected from the white pattern during a few successive cycles of scaling and developing operation.

FIG. 8 shows the image-transfer drum 42 on the photosensitive peripheral surface of which is formed a visible toner image 74' of the white pattern 74. When such a visible toner image of the white pattern 74 is produced repeatedly with the drum 42 driven for rotation for two or more turns, the signal voltage $V_S$ produced from the photoelectric electric transducer 56 fluctuates minutely while varying in cycles each corresponding to a single turn of the drum 42, as indicated in FIG. 9. The minute fluctuations in the signal voltage $V_S$ result from the cyclic fluctuations in the distance of the path of light from the exposure lamp 28 to the drum 42 and the spacing between the peripheral surface of the drum 42 and the developing unit 46 due to the inclined axis of rotation of the drum 42 and the eccentricity of the drum 42. Such fluctuations in the resultant signal voltage $V_S$ could not be avoided if the density of the visualized image 74' of the white pattern 74 is detected at a single point of the peripheral surface of the drum 42.

In order to eliminate influence of the fluctuations in the signal voltage $V_S$, it is herein further proposed that the visualized image density be detected either continuously for a substantially entire circumferential length or for a plurality of such lengths of the peripheral surface of the drum 42 or at two or more points of the peripheral surface of the drum 42. The effective visualized image density ID may be calculated as the arithmetic mean value of the image density distribution or image densities thus detected and such a mean value may be obtained by a suitable hardware application using, for example, an integration circuit.

The changes in the image forming characteristics of the optical scanning and image reproducing systems 24 and 26 due to deposits of dust and ingress of stains into the systems are ordinarily caused not during a short period of time but after the apparatus has been put to use for an extended period of time. For this reason, the detection of the visualized image density through the scanning of the white pattern 74 need not be effected frequently during use of the apparatus but may be effected each time a predetermined number of printed outputs have been produced (which number of printed outputs is herein assumed to be ten by way of example). For this purpose, the cycles of operation of the apparatus may be counted until the predetermined number of printed outputs are produced and, when it is found that such a number of printed outputs are produced, the visualized image density of the white pattern 74 may be detected and the count of the cycles of operation reset for re-starting the counting operation. This is advantageous for saving the consumption of toner particles that would otherwise be consumed for the detection of the visualized image density remaining unchanged and precluding the wear and reduction in the service life of the mechanical driving systems of the apparatus.

In the control system embodying the present invention, testing operation is thus performed through the scanning and development of the image of the white pattern 74 used as a reference image. Such testing operation may be carried out before or after the original document to be duplicated is actually scanned over the main scanning platen 22 or preferably by the time a print sheet to which a visible tone image has been transferred is discharged from the apparatus. Where the testing operation is to be performed each time a predetermined number of printed outputs have been produced as above noted, it may happen that the predetermined number of printed outputs are produced during printing operation for producing a specified, larger number of printed outputs In such a case, the testing operation may be performed with the printing operation interrupted temporarily before the specified number of printed outputs are produced It is, however, considered that there would not be an appreciable degree of change in the visualized image density in the image reproducing system 26 until the printing operation for the specified number of printed outputs is complete. When the number of printed outputs predetermined for the testing operation is reached before the specified larger number of printed outputs are produced, the testing operation may be carried out after the last one of the specified number of printed outputs is produced and discharged from the apparatus.

The data obtained by each cycle of testing operation is stored into the RAM unit 68 until a predetermined number of cycles (herein assumed to be eight cycles by way of example) of testing operation are executed At the end of the predetermined number of cycles of testing operation, all the data that have been stored into the RAM unit 68 are called back from the memory unit and are processed to calculate the mean value of the visualized image densities detected by the series of testing operations. The lamp voltage $V_L$ thus determined on the basis of the mean value of the image densities will be substantially exempt from the irregularities which the image forming characteristics of the image reproducing system 26 of the apparatus may have in producing visualized images on the image-transfer drum 42. The RAM unit 68 into which the data representative of the detected image densities are to be stored is furnished with a backup power supply as previously noted and is thus capable of retaining such data if the power supply for the apparatus is interrupted.

FIGS. 10A to 10D show a preferred example of the routine program to be executed in a control system according to the present invention, specifically by means of the central processing unit 60 which forms part of the control circuitry 58.

Figure 10A:
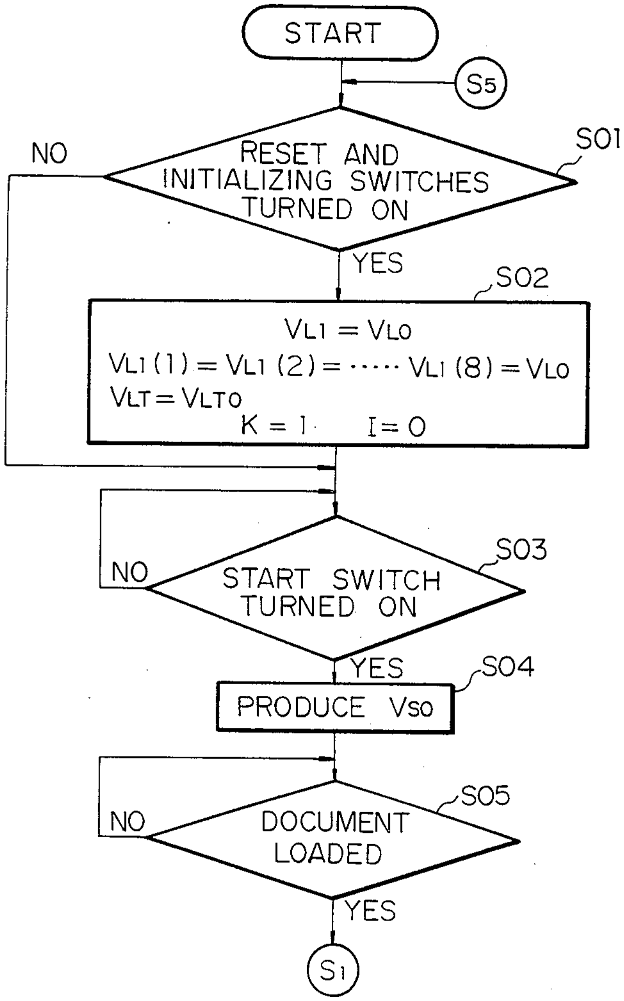
FIGS. 10A to 10D are flowcharts showing a preferred example of the routine program to be executed in a control system according to the present invention.

Referring to FIG. 10A, the central processing unit 60 starts execution of the routine program in response to the apparatus initially switched in and first proceeds to step S01 at which is confirmed whether or not the reset and initializing switches are turned on. When it is found at this step S01 that such switches are turned on, the central processing unit 60 proceeds to step S02 at which the lamp voltage $V_L$ to give the value 0.1 of the visualized image density ID and the lamp voltages $V_{L1}(1)$ to $V_{L1}(8)$ for the visualized image densities to be detected during the scheduled first to eighth cycles of testing operation are set each at the initial value $V_{L0}$ and, in addition, the lamp voltage $V_{LT}$ corresponding to the effective visualized image density $ID_T$ is set at a predetermined initial value V, Furthermore, the order of the cycles of testing operation generally represented by a Kth cycle of testing operation is set at "1" and the number I of cycles of printing operation to be repeated is set at "0" at the step S02. Subsequently to the step S02 or when it is found at the preceding step S01 that the reset and initializing switches have not been turned on, the central processing unit 60 proceeds to step S03 at which is tested whether or not the print start switch is turned on.

When it is detected at the step S03 that the print start switch is turned on, the step S03 is followed by a step S04 at which the central processing unit 60 issues an instruction to drive the image-transfer drum 42 is for rotation. The image density of the photosensitive peripheral surface of the rotating drum 42 is detected by the photoelectric transducer 56 with no visible images produced thereon to produce the signal voltage $V_{S0}$ for use in the calculation according to the equation (3). The signal voltage $V_{S0}$ is given as an arithmetic mean value of the voltage produced through detection of the image density distribution throughout the entire circumferential length of the image-transfer drum 42. The apparatus waits until it is determined at step S05 that a document sheet D to be duplicated is loaded into the apparatus.

Figure 10B:
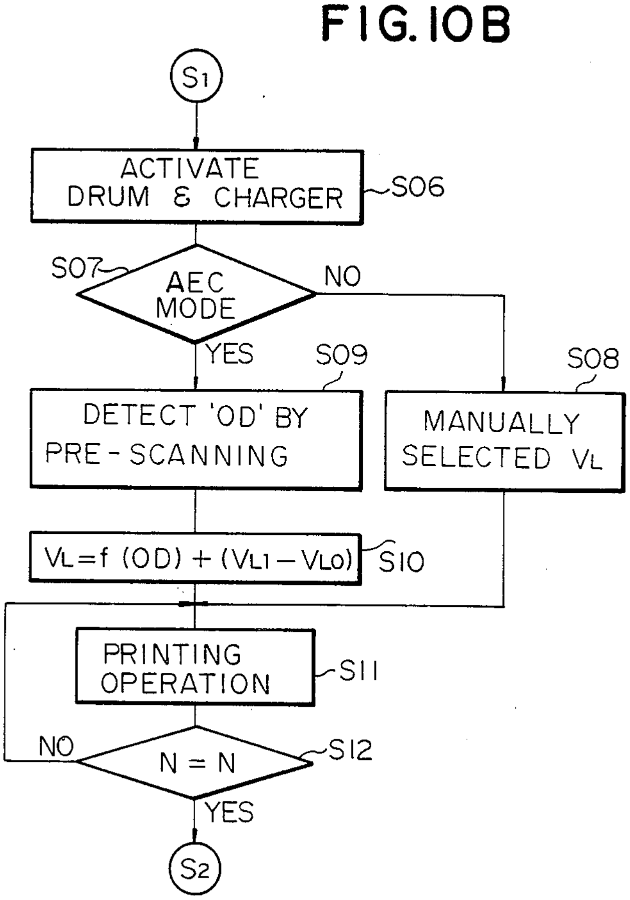

When it is determined at the step S05 that the document sheet D to be duplicated has been loaded into the apparatus, the central processing unit 60 proceeds to step S06 shown in FIG. 10B and issues instructions to drive the image-transfer drum 42 for rotation and activate the main charger 44. The step S06 is followed by a step S07 at which it is tested whether or not the automatic exposure control (AEC) mode has been selected with the enable switch 70 turned on. If it is confirmed at this step S07 that the switch 70 remains open and the automatic exposure control mode not selected, the central processing unit 60 issues an instruction at step S08 to optically scan the document sheet D through the main scanning platen 22 with the exposure lamp 28 energized with a lamp voltage which is manually selected at the control panel of the apparatus.

If it is found at the step S07 that the switch 70 is closed and the automatic exposure control mode selected, then the step S07 is followed by a step S09 at which the central processing unit 60 issues an instruction to enable the photoelectric transducer 54 to detect the original image density OD of the document sheet D through the pre-scanning platen 52. The document sheet D is irradiated with the light emitted from the exposure lamp 28 energized to a predetermined voltage of typically 55 volts as previously noted. Subsequently to the step S09, the lamp voltage $V_L$ for the detected original image density OD is shifted to have the value $V_L$ l responsive to the image density of the white pattern 74. For this purpose, the lamp voltage $V_L$ is initially set at a value f(OD) dependent on the detected original image density OD and, on the assumption that, the lamp voltage responsive to the image density of the white pattern 74 is equal to the value $V_{L0}$, an arithmetic operation is performed to calculate the value of the lamp voltage $V_L$ from the relation $$V_L = f(OD) + (V_{L1} - V_{L0}).$$

It may be noted that the value $V_{L1}$ in this equation has been set to be equal to the value $V_{L0}$ by the step S02.

The lamp voltage $V_L$ for either the manual mode of exposure control or the automatic mode of exposure control is thus determined by the step S08 or the step S10, respectively. Accordingly, the step S08 or S10 is followed by a step S11 at which the central processing unit 60 issues instructions to activate the optical scanning and image reproducing systems 24 and 26 of the apparatus to scan the document sheet D, develop the resultant latent images on the image-transfer drum 42 and transfer the visualized images to the print sheet P passed from the print sheet supply unit (not shown). When such a cycle of printing operation is complete, it is queried at step S12 whether or not cycles of printing operation have been repeated a preliminarily specified number of times N. The loop consisting of the steps S11 and S12 is recycled until it is determined at step S12 that the cycles of printing operation have been repeated the specified number of times N.

Figure 10C:
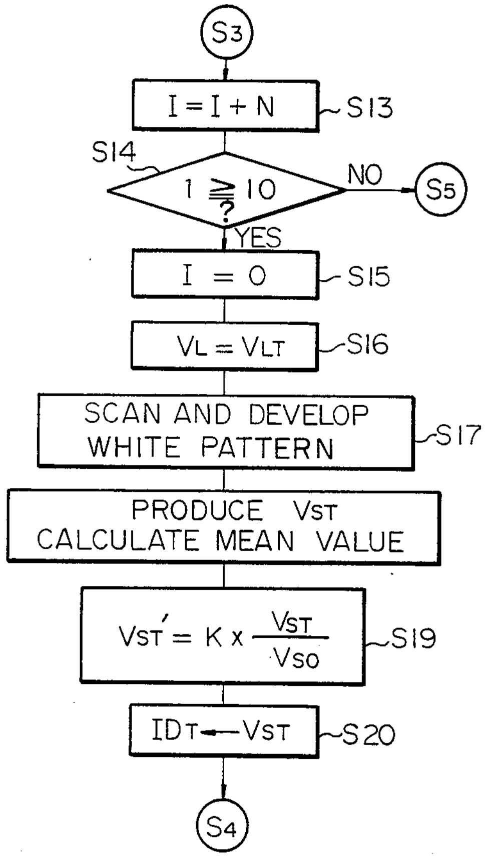
Figure 10D:
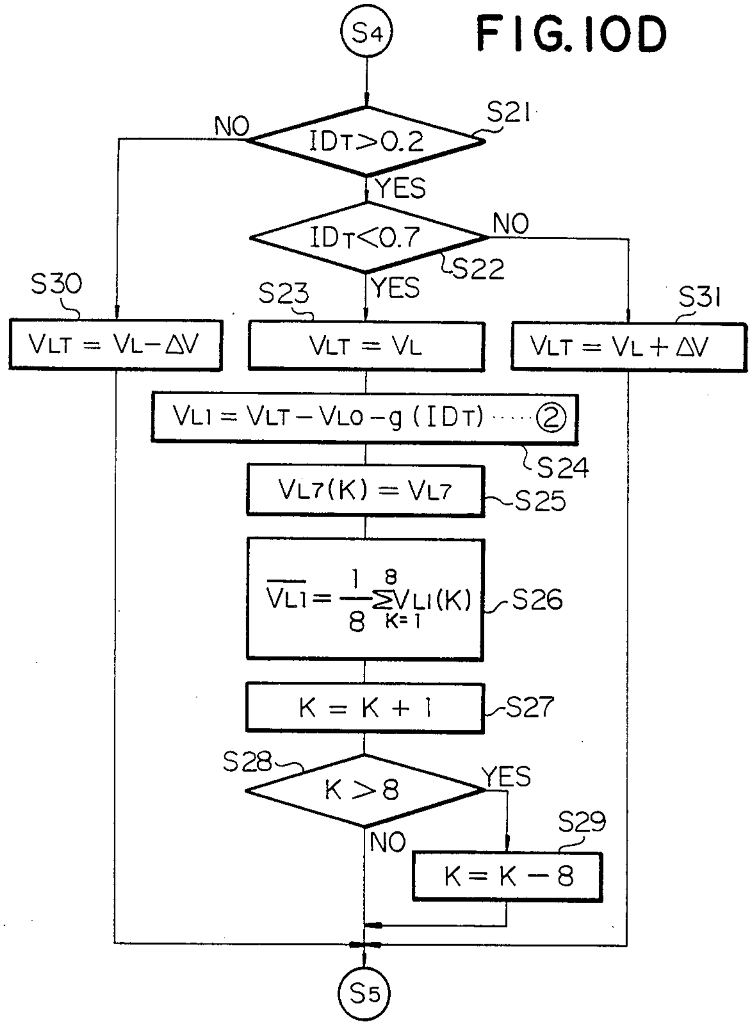

After the cycles of printing operation have been repeated the specified number of times N, the central processing unit 60 proceeds to step S13 shown in FIG. 10C wherein the number of times N is added to the number I of cycles of printing operation which has been initially set at "0" by the initializing step S02. The step S13 is followed by a step S14 at which is tested whether or not the resultant number I of cycles of printing operation has reached the predetermined number "10". If the answer for this decision step S14 is given in the negative, then the central processing unit 60 reverts to the step S01 to repeat the series of steps S01 to S14.

If it is found at the step S14 that the number I of cycles of printing operation is short of the predetermined number "10", then the step S14 is followed by a step S15 to reset the current number I of cycles of printing operation to start the testing operation followed by the correction of the lamp voltage $V_L$. The testing operation is started at step S16 by which the lamp voltage $V_L$ is set at the value $V_{LT}$ immediately (or in several milliseconds to several seconds) after the last one of the predetermined cycles of printing operation was complete. It may be noted that the value $V_{LT}$, set to be equal to the value $V_{L0}$ by the initializing step S02.

The step S16 is followed by a step S17 at which the central processing unit 60 issues instructions to activate the optical scanning and image reproducing systems 24 and 26 of the apparatus to scan the white pattern 74 through the scanning platen 22 and develop and visualize the resultant latent image of the white pattern 74 on the image-transfer drum 42. The visible toner image 84' of the white pattern 74 is formed throughout the circumference of the image-transfer drum 42. The density ID of the visualized image thus formed on the photosensitive peripheral surface of the image-transfer drum 42 is then detected by the photoelectric transducer 56 at a predetermined number of spaced points such as eight spaced points along the circumferentially extending visualized image 74' on the peripheral surface of the drum 42 as at step S17 at which the data thus obtained are further processed to calculate the mean value of the total of eight values of the visualized image density ID. The voltage representative of the mean value thus calculated as being representative of the visualized image density ID is now used as the signal voltage $V_{ST}$ from which the effective visualized image density $ID_T$ is to be obtained.

The central processing unit 60 then proceeds to step S19 to correct the signal voltage $V_{ST}$ to remove the effect which may have resulted from the deposit of toner particles on the photoelectric transducer 56. Such correction of the voltage $V_{ST}$ is made using the signal voltage $V_{S0}$ from the photoelectric transducer 56 responsive to the image-transfer drum 42 having no visualized images carried on its peripheral surface. The corrected voltage, $V_{ST}'$, is calculated from the equation $V_{ST}'=k\ x(V_{ST}/V_{So})$ where k is a constant which is defined by the voltage produced by the photoelectric transducer 56 responsive to the image-transfer drum 42 having its peripheral surface maintained perfectly clean as previously noted.

From the corrected voltage $V_{ST}$ is then obtained at subsequent step S20 the visualized image density $ID_T$ from L the relationship between the signal voltage $V_S$ and the visualized image density ID as shown in FIG. 5 and stored in the RAM unit 68. The visualized image density $ID_T$ is tested at steps S21 and S22 to assure that the value thereof is larger than 0.2 and smaller than 0.7 and is certainly the effective visualized image density $ID_T$.

When it is confirmed by the steps S21 and S22 that the image density $ID_T$ is the effective visualized image density, then at step S23 the lamp voltage $V_L$ is adjusted to the value $V_L$ T The step S23 is followed by a step S24 at which the data representative of the voltage $V_{LT}$, thus established as the lamp voltage V is processed to calculate the value $V_{L1}$ from the equation (2), viz., $V_{L1}=V_{LT}+(V_{L0}-g(ID_T))$, wherein the function $g(ID_T)$ represents the lamp voltage which yields the visualized image density $ID_T$ in accordance with the density-voltage characteristics indicated by curve $D_1$ of FIG. 6 when the white pattern 74 is optically scanned and the resultant image developed on the image-transfer drum 42. The value $V_{L0}$ is a constant which represents a lamp voltage yielding the value 0.1 of the visualized image density ID. The relationship between value $V_{L0}$ and the function $g(ID_T)$ is known and stored in the RAM unit 68 as previously noted. In these manners, the lamp voltage $V_L$ 1 yielding the image density ID of 0.1 can be obtained accurately from the $V_{LT}$ and corresponding effective visualized image density $ID_T$.

The data representative of the value $V_{L1}$ of the lamp voltage as obtained at the step S24 is stored into a memory area $V_{L1}$ (K) of the RAM unit 68 at step S25, wherein the value of K is given as "1" for the first one of the scheduled first to eighth cycles of testing operation. At the point of time the data is stored into the memory area $V_{L1}$ (1) of the RAM unit 68, the data representative of the lamp voltage stored in each of the other memory areas $V_{L1}$ (2) to $V_{L1}$ (8) is still maintained at the initially set value $V_{L0}$. Subsequently to the step S25, the arithmetic mean of the values $V_{L1}$ (1), . . . is calculated at step S26, whereupon the value of K is incremented by one at step S27 and it is questioned at step S28 whether or not the value of K has exceeded the number 8. When it is found that the answer for this step S27 is given in the negative, the central processing unit 60 reverts to the step S01.

The next cycle of testing operation is performed when ten cycles of printing operation are thereafter performed but, if it is found the ten cycles of printing operation are terminated during operation for producing a larger specified number of printed outputs, the next testing cycle is performed upon termination of the printing operation for such a number of printed outputs. In this fashion, the data representative of the value $V_{L1}$ of the lamp voltage is obtained at step S24 and is stored into the corresponding memory area of the RAM unit 68 during each of the second to eighth cycles of testing operation. When the eight cycles of testing operation are complete and the data representative of the values $V_{L1}$ of the lamp voltage obtained by the testing operation are stored into all the memory areas $V_{L1}$ (1) to $V_{L1}$ (8) of the RAM unit 68 at step S25. Subsequently to the step S25, the arithmetic mean of the values $V_{L1}$ (1), $V_{L1}$ (2), . . . $V_{L1}$ (8) is calculated at step S26, and it is finally questioned at step S28 whether or not the value of K has exceeded the number 8. The answer for this step S27 is now given in the positive, the central processing unit 60 proceeds to step S29 at which the data obtained by the ninth cycle of testing operation is stored into the first memory area $V_{L1}$ of the RAM unit 68.

When it is found at the step S21 that the visualized image density $ID_T$ is less than 0.2, the value $V_{LT}$ of the lamp voltage $V_L$ is reduced by a predetermined value at step S30 and the subsequent cycles of testing operation are performed with use of such a reduced lamp voltage until the image density $ID_T$ becomes larger than 0.2 . If, on the other hand, it is found at the step S22 that the visualized image density ID is larger than 0.7, the value $V_{LT}$ of the lamp voltage $V_L$ is increased by a predetermined value at step S31 and the subsequent cycles of testing operation are performed with use of such an increased lamp voltage until the image density $ID_T$ becomes less than 0.7.

What is claimed is:

1. In an image forming apparatus including a rotatable member having a photosensitive surface, optical scanning means including an exposure lamp for irradiating an image-carrying carrying original document with light for producing an information-bearing beam of light and projecting the information-bearing beam of light onto said photosensitive surface for producing a latent image thereon, and image reproducing means for developing said latent image into a visible image on said surface, an exposure control system for controlling the quantity of light with which said image-carrying document is to be irradiated, comprising:

(a) first detecting means for detecting the original image density of said original document and producing a first signal variable with the detected original image density, (b) control means for regulating the quantity of light with which said image-carrying document is to be irradiated by said exposure lamp, the quantity of light being regulated on the basis of the signal from said first detecting means, (c) a reference pattern located to be irradiated with light from said exposure lamp, (d) second detecting means for detecting the visualized image density of said reference pattern and producing a second signal variable with the detected visualized image density, (e) modifying means for modifying the quantity of light from said exposure lamp so that the value represented by the second signal falls within a predetermined range, and (f) correcting means for correcting the quantity of light controlled by said control means, the controlled quantity of light being corrected by said correcting means on the basis of the second signal from said second detecting means and the quantity of light dictated by the second signal.

2. An exposure control system as set forth in claim 1, further comprising means for controlling said modifying means so that the modifying means is enabled to modify the quantity of light from said exposure lamp after a predetermined number of cycles number of image forming operation have been performed.

3. An exposure control system as set forth in claim 1, further comprising means for controlling said modifying means so that the modifying means is enabled to modify the quantity of light from said exposure lamp before said scanning and image reproducing means are enabled for image forming operation.

4. An exposure control system as set forth in claim 1, further comprising means for controlling said modifying means so that the modifying means is enabled to modify the quantity of light from said exposure lamp after said scanning and image reproducing means complete the image forming operation.

5. An exposure control system as set forth in claim 1, in which said correcting means is operative to correct said controlled quantity of light on the basis of an arithmetic mean value of a plurality of signals from said second detecting means.

6. An exposure control system as set forth in claim 1, in which said photosensitive surface of said rotatable member is substantially cylindrical and in which said second detecting means is operative to detect the visualized image density of said reference pattern for at least a single substantially entire circumferential length of the cylindrical photosensitive surface.

7. An exposure control system as set forth in claim 1, in which said control means is operative to regulate the quantity of light on the basis of the characteristic curve which is indicative of the relationship between the detected original density and the corresponding quantity of light.

8. An exposure control system as set forth in claim 7, in which said correcting means is operative to shift said characteristic curve.

9. An exposure control system as set forth in claim 1, in which said reference pattern comprises a white pattern.

10. An exposure control system as set forth in claim 9, in which said predetermined range is substantially equal to the range in which the visualized image of said white pattern obtained has a medium degree of density 11. An exposure control system for varying a lamp exposure of an original in an electrostatic image forming system, wherein an electrostatic latent image is formed by projecting an original image onto a rotating cylindrical photosensitive member and then the elecrostatic latent image is transferred onto a transfer paper after making it into a visible image by development comprising:

a standard pattern disposed at a position where it is illuminated by the lamp;

means for compensating for eccentric rotation of the cylindrical photosensitive member on setting a light emission including measuring means for measuring the visible image density of the standard pattern formed on the cylindrical photosensitive member, said measuring means being operable to measure the visible image density for at least substantially a circumferential length of the cylindrical photosensitive member and including detecting means for detecting the visible image density on the peripheral surface of the photosensitive member and calculating means for calculating a value of the detected visible image density which can compensate for any eccentric rotation; and means for controlling the light emission of the lamp according to the calculated value of the visible image density measured by the measuring means about the circumference of the cylindrical photosensitive member.

12. An exposure control system as claimed in claim 11, wherein said measuring means includes the detecting means detecting the visible image density at a plurality of points on the peripheral surface of the photosensitive member and the calculating means calculates a mean value of the detected visible image density.

13. An exposure control system for varying a lamp exposure of an original in an electrostatic image forming system, wherein an electrostatic latent image is formed by projecting an original image on a photosensitive member and then the electrostatic latent image is transferred onto a transfer paper after making it into a visible image by development, comprising:

first measuring means for measuring the original density;

a standard pattern disposed at a position where it is illuminated by the lamp;

means for counting the number of image forming operations;

second measuring means for measuring the visible image density of the standard pattern when the number of image forming operations counted by the counting means reaches a predetermined number or more;

means for outputting corrective data relative to the light amount of the lamp obtained by changing the light amount of the lamp so as to make the value of the visible image density detected by the second measuring means fit a fixed value or fall within a fixed predetermined range of values; and means for controlling the light amount of the lamp according to the corrective data and the original density measured by the first measuring means.

14. An exposure control system as claimed in claim 13, wherein said second measuring means measures the visible image after the termination of the image forming operation.

15. An exposure control system for varying the exposure of an original by a light assembly in an electrostatic image forming system, wherein an electrostatic latent image is formed by projecting an original image on a photosensitive member and then the electrostatic latent image is transferred onto a transfer paper after making it into a visible image by development, comprising:

first measuring means for measuring the original density;

a standard pattern disposed at a position where it is illuminated by the light assembly;

second measuring means for measuring the visible image density of the standard pattern;

means for outputting corrective data relative to light output of the light assembly obtained by changing the light amount of the light assembly so as to make the value of the visible image density detected by the second measuring means fit a fixed value or fall within a predetermined range of values;

means for storing the corrective data output from said outputting means;

means for calculating a mean value of the corrective data stored by the storing means; and means for controlling the light amount of the light assembly according to the mean value of the corrective data and the original density measured by the first measuring means.

16. An exposure control system as claimed in claim 15, wherein said storing means stores until a predetermined number of cycles of the measuring operation of the second measuring means are executed.

17. An exposure control systems as claimed in claim 15, wherein said control means includes means for regulating the light emission of the light assembly based on a characteristic curve which is indicative of the relationship between the detected original density and the corresponding amount of light, and means for correcting the amount of light regulated by said regulating means based on the corrective data output from the outputting means.

18. An exposure control means as claimed in claim 17 wherein said correcting means is operable to shift said characteristic curve.

* * * * *